(12) United States Patent
Abdelaziz et al.

(10) Patent No.: US 12,146,096 B2
(45) Date of Patent: Nov. 19, 2024

(54) SELF-AGGREGATING PARTICLES FOR LOST CIRCULATION MATERIALS AND RELATED METHOD

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Ahmed Amr Mohamed Hafez Abdelaziz, Thuwal (SA); Qi Liu, Thuwal (SA); Thomas Finkbeiner, Thuwal (SA); Juan Carlos Santamarina, Thuwal (SA); Mohammad Arfaj, Dhahran (SA); Raed A. Alouhali, Dhahran (SA); Timothy Eric Moellendick, Dhahran (SA)

(73) Assignees: SAUDI ARABIAN OIL COMPANY, Dhahran (SA); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/170,189

(22) Filed: Feb. 16, 2023

(65) Prior Publication Data

US 2024/0279531 A1    Aug. 22, 2024

(51) Int. Cl.
| | |
|---|---|
| *C09K 8/516* | (2006.01) |
| *C09K 8/502* | (2006.01) |
| *C09K 8/506* | (2006.01) |
| *E21B 33/138* | (2006.01) |

(52) U.S. Cl.
CPC .............. *C09K 8/516* (2013.01); *C09K 8/502* (2013.01); *C09K 8/506* (2013.01); *E21B 33/138* (2013.01)

(58) Field of Classification Search
CPC ........ C09K 8/516; C09K 8/502; C09K 8/506; E21B 33/138
See application file for complete search history.

(56) References Cited

U.S. PATENT DOCUMENTS

| | | | |
|---|---|---|---|
| 4,614,599 A | 9/1986 | Walker | |
| 4,664,816 A | 3/1987 | Walker | |
| 4,704,213 A | 11/1987 | Delhommer et al. | |
| 7,857,057 B2 | 12/2010 | Stephenson et al. | |
| 9,587,163 B2 | 3/2017 | Gaudette et al. | |
| 9,909,404 B2 | 3/2018 | Hwang et al. | |
| 10,538,695 B2 | 1/2020 | Cannan et al. | |
| 11,292,950 B2 * | 4/2022 | Alouhali | C09K 8/516 |
| 11,352,547 B2 * | 6/2022 | Pearl, Jr. | C09K 8/5045 |
| 2007/0131424 A1 | 6/2007 | Fripp | |
| 2014/0131041 A1 | 5/2014 | Liang et al. | |
| 2014/0231082 A1 | 8/2014 | Jamison et al. | |
| 2015/0330212 A1 | 11/2015 | Sassi et al. | |
| 2017/0137702 A1 * | 5/2017 | Khlestkin | E21B 43/267 |
| 2017/0145283 A1 | 5/2017 | Villarreal et al. | |

FOREIGN PATENT DOCUMENTS

| | | |
|---|---|---|
| CA | 1267075 A | 3/1990 |
| CA | 3112252 A1 | 6/2020 |
| WO | 2016191633 A1 | 12/2016 |

OTHER PUBLICATIONS

Roy, Mrinmoy & Sharma, Vikram & Bhawna, & Alam, Aftab & Aslam, Mohammed. (2021). Photoinduced quasi-2D to 3D phase transformation in hybrid halide perovskite nanoplatelets. Physical Chemistry Chemical Physics. 23. 10.1039/D1CP03529K.
Written Opinion and International Search Report from corresponding PCT Application No. PCT/US2024/014874 mailed May 7, 2024.

* cited by examiner

*Primary Examiner* — Kumar R Bhushan
(74) *Attorney, Agent, or Firm* — Vorys, Sater, Seymour and Pease LLP

(57) ABSTRACT

Lost circulation materials may include a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles. The aggregated particles have a larger effective size and can seal large openings/apertures in the subsurface that cause lost circulation during a wellbore drilling operation.

9 Claims, 5 Drawing Sheets

SELF-AGGREGATING PARTICLES FOR LOST CIRCULATION MATERIALS AND RELATED METHOD

FIELD OF THE DISCLOSURE

The present disclosure relates generally to lost circulation materials and related methods.

BACKGROUND OF THE DISCLOSURE

Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and highly permeable formations (e.g., formations having a permeability greater than 500 millidarcy). Lost circulation can be categorized by the amount of fluid or mud lost as seepage type, moderate type, severe type, and total loss.

To mitigate lost circulation, lost circulation materials may be included in the drilling fluid. Lost circulation materials are materials such as granular particles that are of sufficient size to plug the permeable portions of the formation. Examples of lost circulation materials include nut shells and swellable polymers. The extent of the fluid loss and the ability to control the lost circulation with a lost circulation material depend on the type of formation in which the lost circulation occurs.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method can comprise: drilling at least a portion of a wellbore penetrating a subterranean formation with a drilling fluid that comprises: a base fluid; a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles; and exposing the plurality of particles to a stimulus that causes the degradable coating to decrease in thickness thereby exposing portions of the self-aggregating particles capable of bonding and allowing the plurality of self-aggregating particles to bond into a plurality of aggregated particles.

In another embodiment, a drilling fluid can comprise: a base fluid; and a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles In a further embodiment, composition can comprise: a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
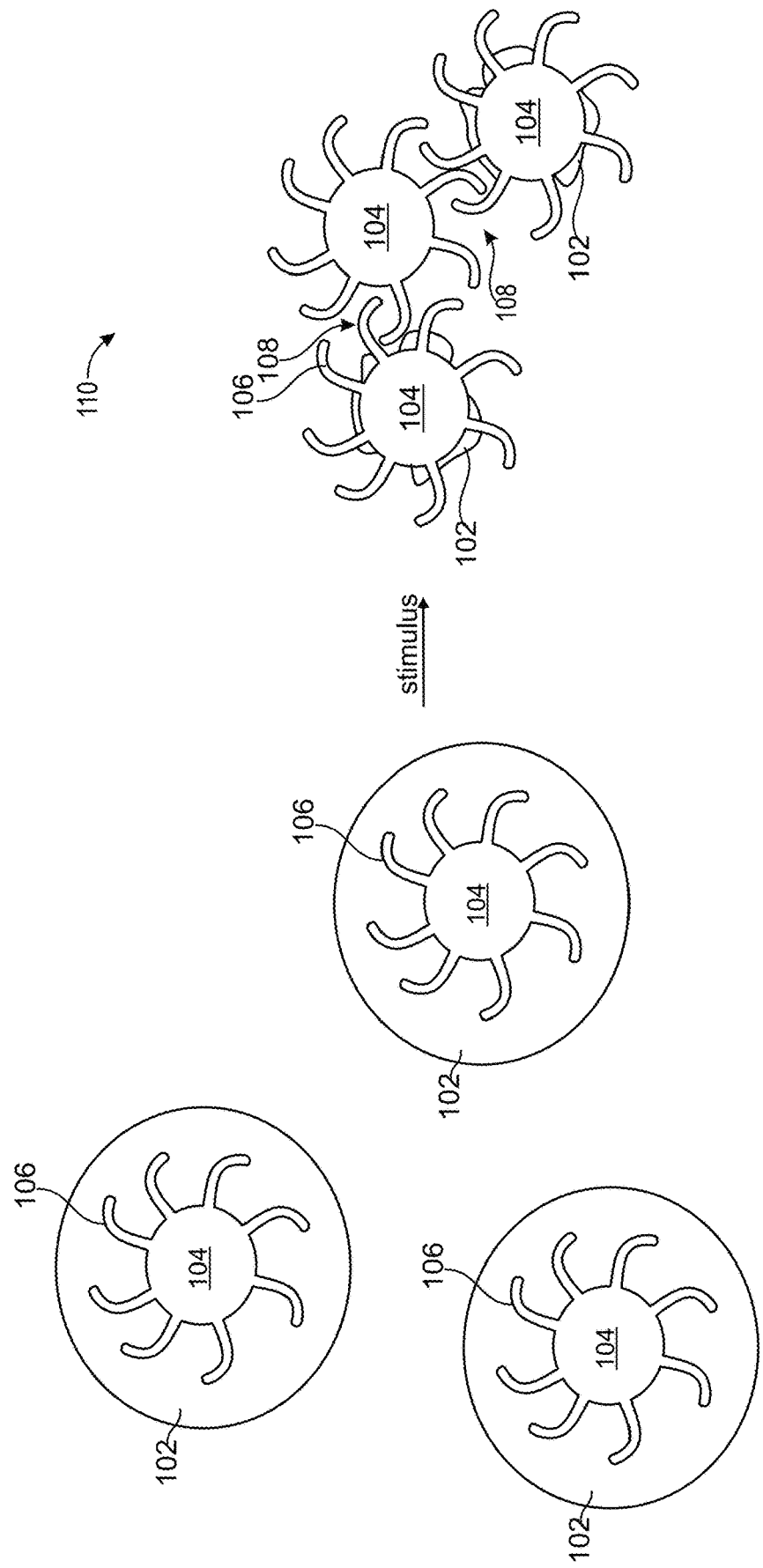
FIG. 1 illustrates a method of bonding the self-aggregating particles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The present disclosure relates generally to lost circulation materials (LCMs) and related methods. More specifically, the LCMs of the present disclosure are self-aggregating particles having a degradable coating where, upon exposure to a stimulus, the degradable coating at least partially degrades and allows the plurality of self-aggregating particles to bond into a plurality of aggregated particles.

FIG. 1 illustrates a method 100 of bonding the self-aggregating particles 104 of the present disclosure. The self-aggregating particles 104 having a degradable coating 102. The illustrated self-aggregating particles 104 comprise physical features, specifically, hooked protrusions 106, that allow for bonding of the self-aggregating particles 104 when the degradable coating 102 is at least partially degraded. The degradable coating 102 degrades when exposed to a stimulus. Degradation of the degradable coating 102 exposes the hooked protrusion 106, which allows the self-aggregating particles 104 to form bonds 108 between particles 108 to produce an aggregated particle 110.

FIG. 1 illustrates an example of self-aggregating particles where the bonding 108 to produce the aggregated particles 110 is mechanical, specifically, hooks. More generally, the self-aggregating particles of the present disclosure are capable of bonding via mechanical interactions, electrical interactions, magnetic interactions, chemical interactions, the like, or any combination thereof to produce aggregated particles. Said bonding may be physical bonding, chemical bonding, magnetic bonding, or a combination thereof.

Mechanical interactions that cause bonding may be achieved with physical features of the self-aggregating particles. Examples of physical features may include, but are not limited to, hooks, protrusion-cavity pairs (e.g., a protrusion that fits into the cavity), complementary particle shapes, the like, and any combination thereof. For a protrusion-cavity pair, each of the self-aggregating particles may have both cavities and protrusions. Alternatively, the self-aggregating particles may include first particles with cavities and not protrusions and second particles with protrusions and no cavities. Complementary particle shapes are shapes of particles that interlock based on shape like a multi-curve shape like an S. Like protrusion-cavity pairs, this may be achieved with a single set of particles where the shapes are interlocking or with a pair (or more) of particles having different shapes that achieve mechanical bonding (e.g., spiral shapes with multi-curve shapes).

Electrical interactions that cause bonding may be achieved by electrostatic attraction between oppositely charged particles, Van der-Waals interactions in submicron fine particles, or dipole-dipole interactions between electrical dipoles.

Magnetic interactions that cause bonding may be achieved with magnetic particles or non-magnetic particles with embedded magnets where the thickness of the degradable coating is used to control the magnetic interaction between said particles. For example, a sufficiently thick degradable coating may mitigate magnetic interaction. Then, upon sufficient degradation to a thinner coating thickness, the self-aggregating magnetic particles may magnetically bond to produce a larger aggregated particle.

Chemical interactions that cause bonding may include, but are not limited to, hydrophobic interactions (e.g., hydrophobic particles agglomerating in a hydrophilic environment), hydrophilic interactions (e.g., hydrophilic particles agglomerating in a hydrophobic environment), capillary interactions at interfaces, and the like. The ability for the self-aggregating particles to bond with chemical interactions may be achieved with the material of the self-aggregating particles or with a coating (not the degradable coating) on the self-aggregating particles.

A combination of the foregoing may be used to produce aggregated particles. For example, mechanical and chemical interactions may both be used where the surface of the self-aggregating particles facilitate bonding via chemical interactions and the self-aggregating particles may be shaped (e.g., have protrusions) that facilitate bonding via mechanical interactions. As such, if the environment in which the aggregated particles changes such that the chemical interactions are less strong, the mechanical interactions may maintain the structural integrity of the aggregated particles.

The self-aggregating particles may have an average diameter of 0.1 mm to 2 mm (or 0.1 mm to 1 mm, or 0.5 mm to 2 mm, or 1 mm to 2 mm). Unless otherwise specified, the diameter of a particle or aggregate of particles is the diameter of the smallest sphere in which the particle or the aggregate of particles fits. Unless otherwise specified, the average diameter of a particle or an aggregate of particles is a weight average diameter.

The self-aggregating particles may have any shape, which may include, but is not limited to, cone, capsule, sphere, ovoid, disc, the like, and any hybrid thereof with or without protrusions or other features for bonding.

The self-aggregating particles may be formed of any suitable material. Examples of materials may include, but are not limited to, polymers, ceramics, glasses, metals, the like, and any combination thereof. Examples of polymers may include, but are not limited to, polyethylenes (PE) (e.g., ultra-high-density PE polycarbonates (PC)), polypropylenes (PP), polyvinyl chlorides (PVC), polystyrenes (PS) (e.g., high-impact PS), polymethyl methacrylates (PMMA), polyamides (e.g., including nylons, such as Nylon 12 and glass-filed nylons), silicones, fluoropolymers (e.g., TEFLON® (polytetrafluoroethylene)), thermoplastic polyurethanes (TPU), acrylonitrile-butadiene-styrene (ABS) triblock polymer, acrylic-styrene-acrylonitrile triblock polymer (ASA), polyaryletherketones (PAEK), polyether ether ketone (PEEK), polyetherimides (PEI), polyethylene terephthalate (PET), polylactides, epoxy resins, the like, and any combination thereof. Examples of ceramics and glasses may include, but are not limited to, crystalline or glassy oxides, nitrides, silicates, carbides, the like, and any combination thereof. For example, ceramics and glasses may include alumina, aluminosilicate glass, aluminum nitride, boron nitride, borosilicate glass, cordierite, Corning PYREX®, graphite, lava (grade A), lead glass, MACOR®, mullite, quartz, sapphire, porcelain, silicon, silicon carbide, silicon nitride, soda-lime glass, STEATITE L-5®, zirconia, the like, and any combination thereof. Examples of metals may include, but are not limited to, aluminum, brass, bronze, cobalt, chromium, copper, gold, platinum, steel, including stainless steel, silver, and titanium, the like, composites thereof, and alloys thereof. The material(s) for the self-aggregating particles should be chosen based, at least in part, on the environment in which the aggregated particles will be exposed so that the aggregated particles maintain sufficient structural integrity.

Self-aggregating particles may also be from natural sources. For example, tribulus terrestris plant seeds can aggregate through the protrusions on their surfaces.

The degradable coating may be formed of any suitable material that causes the coating to thin when exposed to a stimulus. Degradation may be a chemical degradation where the material chemically converts to another substance and/or solubilization where the material is removed from the coating by dissolving in the surrounding environment and/or a thinning (or shrinking) of the coating in response to stimulus.

Examples of stimuli may include, but are not limited to, exposure to an aqueous fluid, exposure to an oleaginous fluid, an increase in temperature, an externally applied electrical field, a change in pH, a change in ionic concentration, the like, and any combination thereof.

Examples of materials for use in the degradable coating that would degrade said coating via solubilization when exposed to water (optionally with additional increase in temperature) may include, but are not limited to, gelatin, polyvinyl alcohol, polyethylene glycol, polysaccharides, carboxymethyl cellulose, polyacrylamides, polyacrylic acid, polyamines, polyethyleneimines, polyvinyl methyl ether, carboxypolymethylene, polyvinylpyrrolidone, poly(N-alkyl) substituted acrylamides, poly(N-vinylalkylamides), polyethylene oxides, polyesters, polyethers, the like, and any combination thereof.

Examples of materials for use in the degradable coating that would degrade said coating via chemical degradation (and/or solubilization) when exposed to water (optionally with additional increase in temperature) may include, but are not limited to, polylactide or polylactic acid (PLA), polyglycolide, polyglycolic acid (PGA), the like, and any combination thereof.

Examples of materials for use in the degradable coating that would degrade said coating via solubilization when exposed to an oleaginous fluid (optionally with additional increase in temperature) may include, but are not limited to, polystyrene, polyethylene, polypropylene, the like, and any combination thereof.

Examples of materials for use in the degradable coating that would de-swell and shrink said coating when exposed to a different pH may include, but are not limited to, chitosan, guar gum, alginic acid, carboxymethyl dextran, the like, and any combination thereof.

The degradable coating may coat all or some of the self-aggregating particles. For example, 25% to 100% of the surface area of the self-aggregating particles may be coated with the degradable coating. For example, the degradable coating may cover the portions of the self-aggregating particles capable of bonding and minimally, if at all, other portions of the self-aggregating particles.

The degradable coating may be a single layer (e.g., as illustrated in FIG. 1) or a plurality of layers. When a plurality of layers is used, the layers may include at least two materials suitable for the degradable coating that are different and responds to different stimuli. For example, a two-coating layer may include an outer layer comprising a material that is water soluble at moderate temperatures and an inner layer that is water soluble at higher temperatures.

The degradable coating (cumulatively for multiple layers) may have a maximum thickness of 1 μm to 100 μm. The degradable coating (before degradation) may make up 10% or less (or 0.1% to 10%, or 0.1% to 5%, or 1% to 10%) of the particle diameter.

The aggregated particles may have an average diameter of 3 mm or greater (or 3 mm to 10 mm). Alternatively, the aggregates may not have a fixed size, as the aggregate size may continue growing with time.

The self-aggregating particles of the present disclosure may be used as lost circulation materials in wellbore fluids like drilling fluids.

A drilling fluid may include a base fluid and the self-aggregating particles of the present disclosure having a degradable coating.

The self-aggregating particles having a degradable coating may be included in a drilling fluid in an amount of 1 pound per barrel (ppb) to 60 ppb (or 1 ppb to 30 ppb, or 15 ppb to 45 ppb, or 30 ppb to 60 ppb).

The base fluid of the drilling fluid may be an oleaginous fluid or an aqueous-based fluid.

The oleaginous fluid may be any suitable fluid, such as oil or a solution containing both oil and one or more organic or inorganic compounds dissolved in the oil or otherwise completely miscible with the oil. The oleaginous fluid may include at least one naturally-derived or synthetically-derived oil. The oleaginous fluid may include oils derived from petroleum, such as mineral oils; diesel oils; linear or branched olefins; polyolefins; alkanes; paraffins; esters of fatty acids; straight chain, branched or cyclical alky ethers of fatty acids; other petroleum-derived oils; or combinations of any of these. The oleaginous fluid may contain esters, ethers, acetals, dialkylcarbonates, hydrocarbons, or combinations of any of these. The oleaginous fluid may also include oils derived from animals or plants, for example. The oleaginous fluid may also include other oils, such as, but not limited to, poly diorganosiloxanes, siloxanes, organosiloxanes, other silicone-based oils, or combinations of these.

An aqueous-based fluid may be any suitable fluid, such as water or a solution containing both water and one or more organic or inorganic compounds dissolved in the water or otherwise completely miscible with the water. Examples of water sources may include, but are not limited to, freshwater, well water, filtered water, distilled water, sea water, salt water, produced water, formation brine, the like, and any combination thereof. For example, the aqueous fluid may contain brine, including natural and synthetic brine. The aqueous fluid may include water containing water-soluble organic compounds, such as alcohols, organic acids, amines, aldehydes, ketones, esters, or other polar organic compounds, or salts dissolved in the water. In some embodiments, the aqueous fluid may include salts, water-soluble organic compounds, or both, as impurities dissolved in the water. Further, the aqueous fluid may include salts, water-soluble organic compounds, or both, to modify at least one property of the aqueous fluid, such as density or ionic concentration. Increasing the amount of salt, water-soluble organic compounds, or both, may increase the density of the drilling fluid. Examples of salts that may be present in the aqueous fluid may include, but are not limited to, metal salts, such as sodium salts, calcium salts, cesium salts, zinc salts, aluminum salts, magnesium salts, potassium salts, strontium salts, silicates, lithium salts, the like, and any combination thereof. The metal salts may be in the form of chlorides, bromides, carbonates, hydroxides, iodides, chlorates, bromates, formates, nitrates, sulfates, phosphates, oxides, fluorides, the like, and any combination thereof.

The drilling fluid may further include other components, which may include, but are not limited to, wetting agents, organophilic clays, viscosifiers, surfactants, dispersants, interfacial tension reducers or emulsifying agents, rheological modifies, pH buffers, mutual solvents, thinners, thinning agents, weighting agents, cleaning agents, the like, and any combination thereof.

The drilling fluids comprising a base fluid, the self-aggregating particles having a degradable coating, and optionally other components may be used in a drilling operation where the self-aggregating particles are lost circulation materials. For example, during a drilling operation, a drilling fluid may be continuously pumped into the wellbore to clear and clean the wellbore and the filings (also referred to as cuttings) resulting from drilling. The drilling fluid is typically pumped from a mud pit into the wellbore and returns again to the surface. An indication that a lost circulation zone has been encountered is when the flow rate of the drilling fluid that returns to the surface is less than the flow rate of the drilling fluid pumped into the wellbore. This reduction or absence of returning drilling fluid is referred to as lost circulation.

Drilling fluids comprising the self-aggregating particles having a degradable coating may be used for drilling all or portions of the wellbore. For example, the self-aggregating particles having a degradable coating may be added to the drilling fluid when a lost circulation zone is encountered. Alternatively, the self-aggregating particles having a degradable coating may be included in the drilling fluid regardless of encountering a lost circulation zone.

After introduction to the wellbore, the self-aggregating particles having a degradable coating may encounter the stimulus. For example, lost circulation zones have fluids native to the formation (e.g., water, acid (causing a pH change), or oil) that act as a stimulus to cause the degradable coating to thin and expose the portions of the self-aggregating particles capable of bonding, which allows the plurality of self-aggregating particles to bond into a plurality of aggregated particles. In another example, the bottom hole circulating temperature may act as a stimulus. More than one stimulus may be encountered after introduction to the wellbore. The aggregates have a larger effective size and can seal large openings/apertures in the subsurface.

Alternate to or in combination with native stimuli, an additive may be added to the drilling fluid that acts as a stimulus. For example, water, oil, acid, or base may be added or introduced to the wellbore via the drilling fluid (or via a spacer fluid) after introduction of the self-aggregating particles having a degradable coating. Accordingly, the drilling fluid with the self-aggregating particles having a degradable coating may enter the formation at the lost circulation zone. Then, the subsequently introduced additive may contact the self-aggregating particles having a degradable coating and cause the degradable coating to thin and expose the portions of the self-aggregating particles capable of bonding, which allows the plurality of self-aggregating particles to bond into a plurality of aggregated particles. The aggregates have a larger effective size and can seal large openings/apertures in the subsurface.

EXAMPLES

Figure 2A:
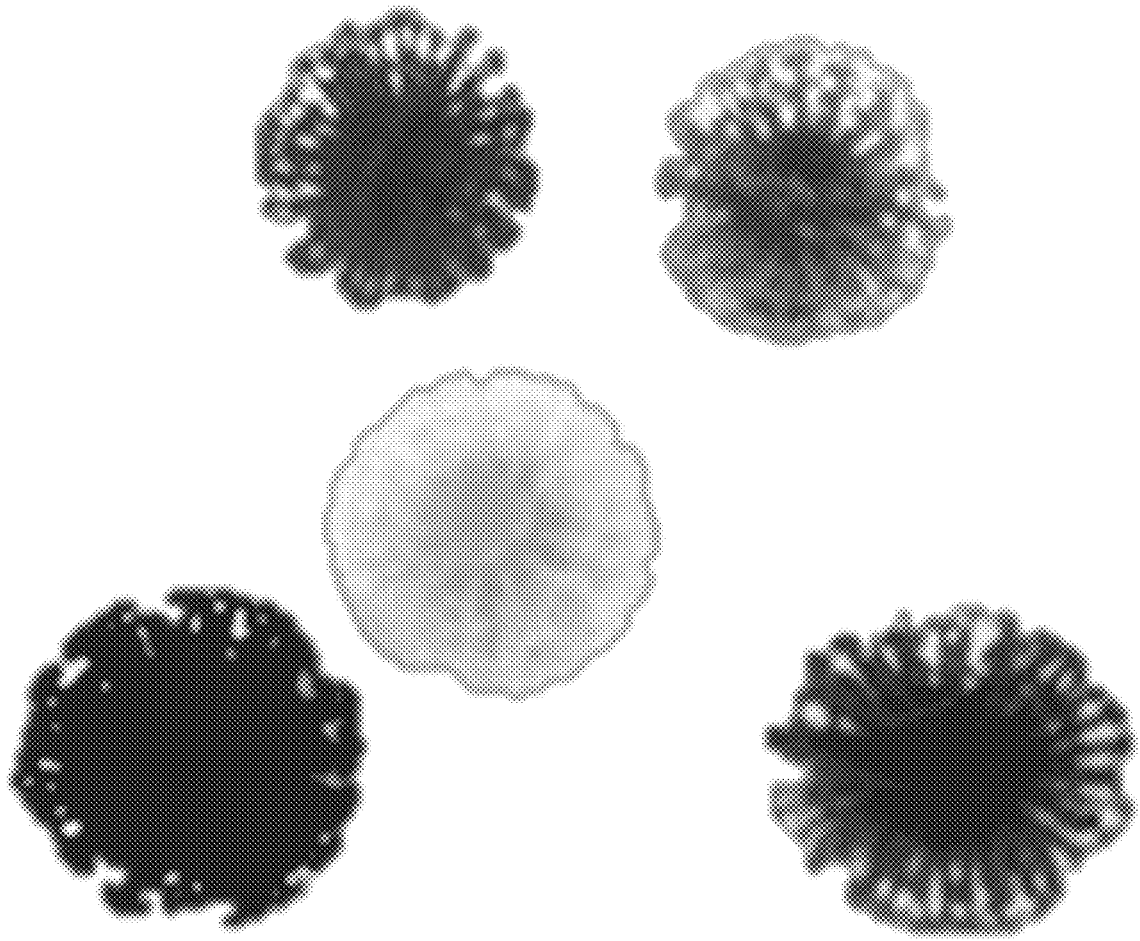
FIG. 2A illustrates plastic balls with hook protrusions.
Figure 2B:
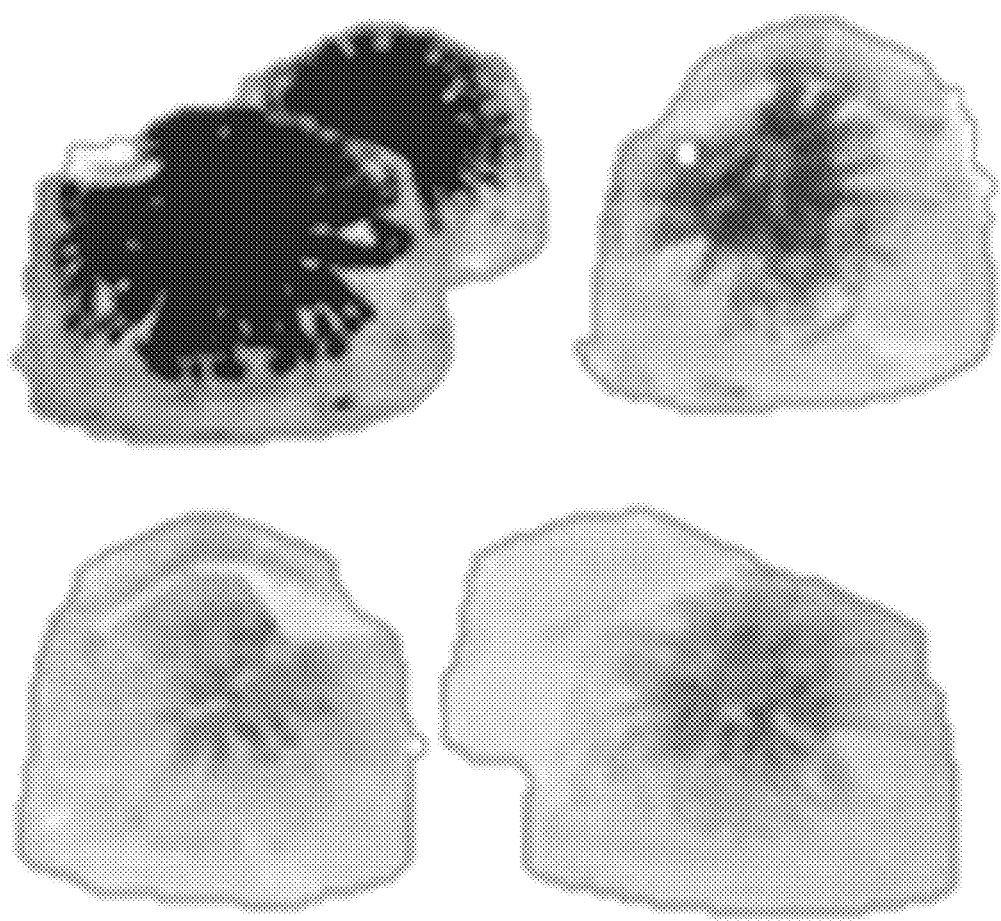
FIG. 2B illustrates the plastic balls with hook protrusions of FIG. 2A coated with gelatin.
Figure 2C:
FIG. 2C illustrates the gelatin-coated balls in agitated water at 22° C.
Figure 2D:
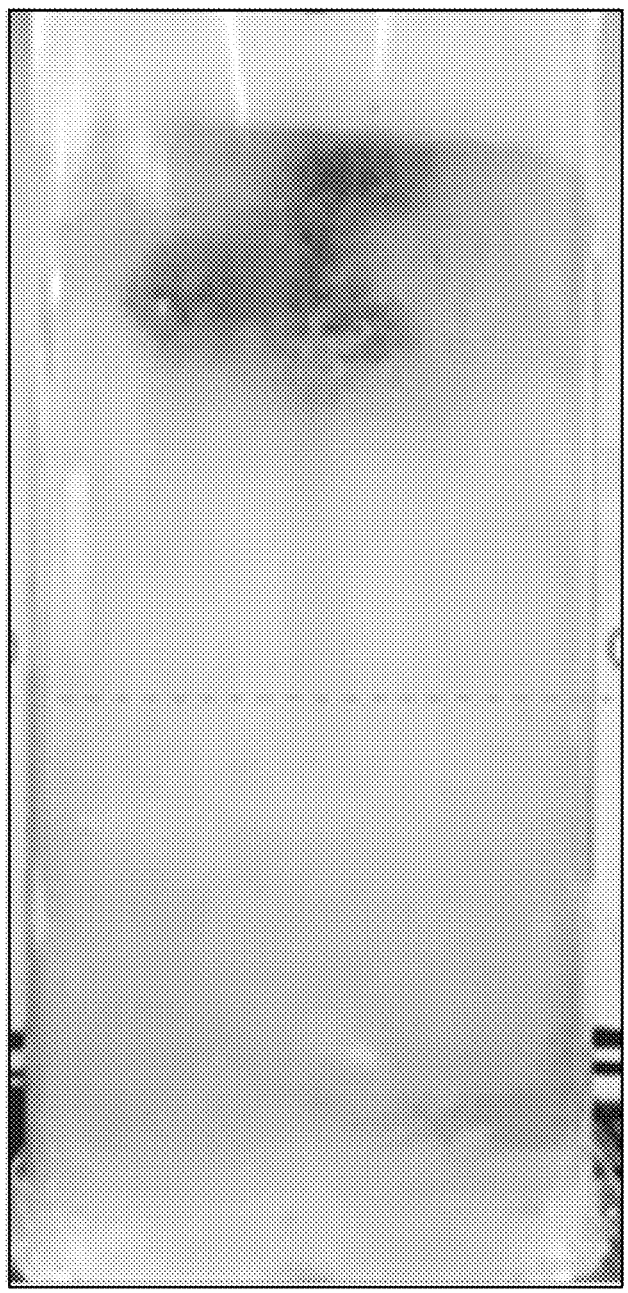
FIG. 2D illustrates the balls in agitated water at 32° C. after dissolution of at least some of the gelatin and mechanical bonding of the plastic balls with hook protrusions into an aggregated particle of the present disclosure.

Bunchem balls (plastic balls with hook protrusions) (FIG. 2A) were coated with gelatin (FIG. 2B). The gelatin-coated Bunchem balls were placed in agitated water at 22° C. (FIG. 2C). The temperature of the water was increased to 32° C. (FIG. 2D) causing the gelatin to dissolve in the water and the Bunchem balls to mechanically bond into an aggregated particle.

Example Embodiments

A first example embodiment disclosed herein includes: a method comprising: drilling at least a portion of a wellbore penetrating a subterranean formation with a drilling fluid that comprises: a base fluid; a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles; and exposing the plurality of particles to a stimulus that causes the degradable coating to decrease in thickness thereby exposing portions of the self-aggregating particles capable of bonding and allowing the plurality of self-aggregating particles to bond into a plurality of aggregated particles. The first example embodiment may have one or more of the following: Element 1: the method further comprising: introducing an additive to the wellbore, wherein the additive is the stimulus; Element 2: wherein the degradable coating comprises a polymer selected from the group consisting of: gelatin, polyvinyl alcohol, polyethylene glycol, polysaccharides, carboxymethyl cellulose, polyacrylamides, polyacrylic acid, polyamines, polyethyleneimines, polyvinyl methyl ether, carboxypolymethylene, polyvinylpyrrolidone, poly(N-alkyl) substituted acrylamides, poly(N-vinylalkylamides), polyethylene oxides, polyesters, polyethers, and any combination thereof; Element 3: wherein the degradable coating comprises a polymer selected from the group consisting of: polystyrene, polyethylene, polypropylene, the like, and any combination thereof; Element 4: wherein the stimulus comprises exposure to an aqueous fluid, exposure to an oleaginous fluid, an increase in temperature, an externally applied electrical field, a change in pH, a change in ionic concentration, exposure to light, or any combination thereof; Element 5: wherein the degradable coating covers 25% to 100% of a surface area of the self-aggregating particles; Element 6: wherein the degradable coating makes up 10% or less of a diameter of the self-aggregating particles having a degradable coating; Element 7: wherein the degradable coating comprises at least two degradable materials that degrade in response to different stimuli; Element 8: wherein the degradable coating comprises a plurality of layers with at least two of the plurality of layers being formed of different degradable materials that degrade in response to different stimuli; Element 9: wherein the mechanical interactions utilize one or more physical features of the particle selected from the group consisting of: a hooked protrusion, a protrusion-cavity pair, complementary particle shapes, and any combination thereof; Element 10: wherein the plurality of particles comprise a first particle shape and a second particles shape that are complementary to effect the mechanical interactions; Element 11: wherein the chemical interactions are hydrophobic or capillary interactions between the plurality of self-aggregating particles; and Element 12: wherein the plurality of self-aggregating particles have an average diameter of 0.1 mm to 2 mm, and wherein the plurality of aggregated particles have an average diameter of 3 mm or greater. Examples of combinations include: Element 1 in combination with one or more of Elements 2-12; Element 2 in combination with one or more of Elements 3-12; Element 3 in combination with one or more of Elements 4-12; Element 4 in combination with one or more of Elements 5-12; Element 5 in combination with one or more of Elements 6-12; Element 6 in combination with one or more of Elements 7-12; Element 7 in combination with one or more of Elements 8-12; Element 8 in combination with one or more of Elements 9-12; Element 9 in combination with one or more of Elements 10-12; and two or more of Elements 10-12 in combination.

A second example embodiment disclosed herein includes: a drilling fluid comprising: a base fluid; and a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles. The second example embodiment may have one or more of the following: Element 13: wherein the degradable coating comprises a polymer selected from the group consisting of: gelatin, polyvinyl alcohol, polyethylene glycol, polysaccharides, carboxymethyl cellulose, polyacrylamides, polyacrylic acid, polyamines, polyethyleneimines, polyvinyl methyl ether, carboxypolymethylene, polyvinylpyrrolidone, poly(N-alkyl) substituted acrylamides, poly(N-vinylalkylamides), polyethylene oxides, polyesters, polyethers, and any combination thereof; Element 14: wherein the degradable coating comprises a polymer selected from the group consisting of: polystyrene, polyethylene, polypropylene, the like, and any combination thereof; Element 15: wherein the degradable coating covers 25% to 100% of a surface area of the self-aggregating particles; Element 16: wherein the degradable coating makes up 10% or less of a diameter of the self-aggregating particles having a degradable coating; Element 17: wherein the degradable coating comprises at least two degradable materials that degrade in response to different stimuli; Element 18: wherein the degradable coating comprises a plurality of layers with at least two of the plurality of layers being formed of different degradable materials that degrade in response to different stimuli; Element 19: wherein the mechanical interactions utilize one or more physical features of the particle selected from the group consisting of: a hooked protrusion, a protrusion-cavity pair, complementary particle shapes, and any combination thereof; Element 20: wherein the plurality of particles comprise a first particle shape and a second particles shape that are complementary to effect the mechanical interactions; Element 21: wherein the chemical interactions are hydrophobic or capillary interactions between the plurality of self-aggregating particles; and Element 22: wherein the plurality of self-aggregating particles have an average diameter of 0.1 mm to 2 mm, and wherein the plurality of aggregated particles have an average diameter of 3 mm or greater; Element 23: wherein the plurality of self-aggregating particles are present in the drilling fluid at 0.1 wt % to 10 wt % based on a weight of the base fluid; and Element 24: the drilling fluid further comprising an additive that is the stimulus. Examples of combinations include: Element 13 in combination with one or more of Elements 14-24; Element 14 in combination with one or more of Elements 15-24; Element 15 in combination with one or more of Elements 16-24; Element 16 in combination with one or more of Elements 17-24; Element 17 in combination with one or more of Elements 18-24; Element 18 in combination with one or more of Elements 19-24; Element 19 in combination with one or more of Elements 20-24; and two or more of Elements 20-24 in combination.

A third example embodiment disclosed herein includes: composition comprising: a plurality of self-aggregating particles having a degradable coating, wherein the self-aggregating particles are capable of bonding via mechanical interactions, electrical interactions, magnetic interactions, chemical interactions, or any combination thereof into a plurality of aggregated particles. The third example embodiment may have one or more of the following: Element 25: wherein the degradable coating comprises a polymer selected from the group consisting of: gelatin, polyvinyl alcohol, polyethylene glycol, polysaccharides, carboxymethyl cellulose, polyacrylamides, polyacrylic acid, polyamines, polyethyleneimines, polyvinyl methyl ether, carboxypolymethylene, polyvinylpyrrolidone, poly(N-alkyl) substituted acrylamides, poly(N-vinylalkylamides), polyethylene oxides, polyesters, polyethers, and any combination thereof; Element 26: wherein the degradable coating comprises a polymer selected from the group consisting of: polystyrene, polyethylene, polypropylene, the like, and any combination thereof; Element 27: wherein the degradable coating covers 25% to 100% of a surface area of the self-aggregating particles; Element 28: wherein the degradable coating makes up 10% or less of a diameter of the self-aggregating particles having a degradable coating; Element 29: wherein the degradable coating comprises at least two degradable materials that degrade in response to different stimuli; Element 30: wherein the degradable coating comprises a plurality of layers with at least two of the plurality of layers being formed of different degradable materials that degrade in response to different stimuli; Element 31: wherein the mechanical interactions utilize one or more physical features of the particle selected from the group consisting of: a hooked protrusion, a protrusion-cavity pair, complementary particle shapes, and any combination thereof; Element 32: wherein the plurality of particles comprise a first particle shape and a second particles shape that are complementary to effect the mechanical interactions; Element 33: wherein the chemical interactions are hydrophobic or capillary interactions between the plurality of self-aggregating particles; and Element 34: wherein the plurality of self-aggregating particles have an average diameter of 0.1 mm to 2 mm, and wherein the plurality of aggregated particles have an average diameter of 3 mm or greater; and Element 35: wherein the plurality of self-aggregating particles are present in the drilling fluid at 0.1 wt % to 10 wt % based on a weight of the base fluid. Examples of combinations include: Element 25 in combination with one or more of Elements 26-35; Element 26 in combination with one or more of Elements 27-35; Element 27 in combination with one or more of Elements 28-35; Element 28 in combination with one or more of Elements 29-35; Element 29 in combination with one or more of Elements 30-35; Element 30 in combination with one or more of Elements 31-35; Element 31 in combination with one or more of Elements 32-35; and two or more of Elements 32-35 in combination.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
    drilling at least a portion of a wellbore penetrating a subterranean formation with a drilling fluid that comprises:
    a base fluid;
    a plurality of self-aggregating particles having a degradable coating, wherein the self-aggregating particles are capable of bonding via mechanical interactions, into a plurality of aggregated particles;
        wherein the mechanical interactions utilize one or more physical features of the particle selected from the group consisting of: a hooked protrusion, a protrusion-cavity pair, and complementary particle shapes; and
    exposing the plurality of particles to a stimulus that causes the degradable coating to decrease in thickness thereby exposing portions of the self-aggregating particles capable of bonding and allowing the plurality of self-aggregating particles to bond into a plurality of aggregated particles.

2. The method of claim 1 further comprising:
    introducing an additive to the wellbore, wherein the additive is the stimulus.

3. The method of claim 1, wherein the degradable coating comprises a polymer selected from the group consisting of: gelatin, polyvinyl alcohol, polyethylene glycol, polysaccharides, carboxymethyl cellulose, polyacrylamides, polyacrylic acid, polyamines, polyethyleneimines, polyvinyl methyl ether, carboxypolymethylene, polyvinylpyrrolidone, poly(N-alkyl) substituted acrylamides, poly(N-vinylalkylamides), polyethylene oxides, polyesters, polyethers, and any combination thereof.

4. The method of claim 1, wherein the degradable coating comprises a polymer selected from the group consisting of: polystyrene, polyethylene, polypropylene, and any combination thereof.

5. The method of claim 1, wherein the stimulus comprises exposure to an aqueous fluid, exposure to an oleaginous fluid, an increase in temperature, an externally applied electrical field, a change in pH, a change in ionic concentration, exposure to light, or any combination thereof.

6. The method of claim 1, wherein the degradable coating covers 25% to 100% of a surface area of the self-aggregating particles.

7. The method of claim 1, wherein the degradable coating comprises at least two degradable materials that degrade in response to different stimuli.

8. The method of claim 1, wherein the degradable coating comprises a plurality of layers with at least two of the plurality of layers being formed of different degradable materials that degrade in response to different stimuli.

9. The method of claim 1, wherein the plurality of self-aggregating particles have an average diameter of 0.1 mm to 2 mm, and wherein the plurality of aggregated particles have an average diameter of 3 mm or greater.

* * * * *